Patented Nov. 29, 1932

1,889,474

UNITED STATES PATENT OFFICE

NILS HARRY GULLANDER, OF MALMO, SWEDEN, ASSIGNOR TO THE FIRM C. & S. CLEMENTSON, OF MALMO, SWEDEN

ENGINE FUEL

No Drawing. Application filed February 26, 1931, Serial No. 518,595, and in Sweden February 14, 1931.

For the purpose of obtaining an improved lubrication of the upper piston parts, the rings thereon, and the valves in internal combustion engines, it has already been proposed in smaller quantities to intermix a lubricating oil, or oil composition, with the liquid fuel, such lubricating oil being then admitted to and atomized together with the fuel in the cylinders. On account of the manner, in which said lubricating agent is introduced, this method of performing a lubrication has been named an "upper lubrication".

In the manner of performing this upper lubrication as hitherto employed, the lubricating action has been found to be very small only, as the lubricating oil used has either been so highly mobile, or light, that its lubricating capacity when contacting with the interior hot parts of the engine has been reduced substantially to nothing, or else, when using heavier oils, their intermixing with the engine fuel has been rendered difficult in a very high degree, and besides such heavy oils have given rise to hard deposits of carbon forming residues of the combustion. These residues have rather increased, instead of reduced, the friction and wearing in the engine, and they have caused a clogging of the piston rings and valves.

By the addition of fat oils or fatty acids to the actual lubricating component, or components, added to the engine fuel, it has been found that an improved lubricating action may be obtained due to saponification by means of the small quantity of water formed at the combustion within the combustion chamber, but fat oils or fatty acids form substantial amounts of friction increasing and clogging residues of combustion, and therefore they have been found unsuitable for upper lubrication purposes.

Now it has been found, however, according to the present invention, that a good lubrication of the upper portions of the cylinders and pistons, as well as of the valves, and simultaneously a comparatively soot-free combustion is obtainable if a mixture of a lubricant oil and small quantities of hydrogenation products of phenol and naphthalene are added to the engine fuel. The hydrogenated phenol acts itself as a lubricant, and together with the water formed at the combustion it will combine into a lubricating emulsion, the hydrogenated naphthalene assisting in the formation of this emulsion and facilitates the same.

The aforesaid advantageous technical result is only obtained in case all of the three substances, i. e. both lubricating oil and hydrogenated phenol and hydrogenated naphthalene are added to the fuel. Therefore, the invention refers only to the addition of a mixture comprising all of these three substances to the conventional engine fuel, but the addition of only one, or perhaps two, of said substances is not included in the invention.

*Example:*—100 parts of a common engine fuel is admixed with 0.25 parts of a mixture consisting of about 30% of a highly mobile lubricant oil (the viscosity being about 4–6 degrees of Engler at a temperature of 20° C.), about 35–40% of tetra hydro-naphthalene and about 25–30% of hydrogenated phenol. In this manner, a homogenous and highest grade engine fuel will be obtained, such fuel having lubricating properties, and is combustible practically without any rests of carbon.

By using the aforesaid additional components together with, or in, the upper lubricating oil, or engine fuel, for the purpose of saponification of the lubricant proper, so as thereby to obtain an improved lubricating action, no hard or solid residues of combustion are formed. Besides no deposits of carbon or oil pitch will arise between the piston rings and on the valve spindles, as otherwise would be the case due to the combustion of the lubricant proper, but such deposits will be solved, or subdivided, in such a manner that they will escape together with the exhaust gases.

Hydrogenated phenol and hydrogenated naphthalene are easily intermixed both with the oil, or oils, used for upper lubrication purposes, and with all of the common engine fuels now in use, and with regard to the latter they form besides a valuable agent of homogenization for engine fuels having an incorporated component of different kinds of spirits.

What I claim and desire to secure by Letters Patents is:—

In a conventional engine fuel, the addition of a mixture consisting of suitable lubricating oil, hydrogenated naphthalene and hydrogenated phenol.

In testimony whereof I have signed my name to this specification.

NILS HARRY GULLANDER.